(12) United States Patent
You et al.

(10) Patent No.: US 8,180,347 B2
(45) Date of Patent: May 15, 2012

(54) DOMAIN TRANSFERRING METHOD FOR SINGLE RADIO VOICE CALL CONTINUITY

(75) Inventors: Shilin You, Shenzhen (CN); Jiyan Cai, Shenzhen (CN); Zhenwu Hao, Shenzhen (CN); Zhiming Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 97 days.

(21) Appl. No.: 12/866,202

(22) PCT Filed: Dec. 31, 2008

(86) PCT No.: PCT/CN2008/002157
§ 371 (c)(1),
(2), (4) Date: Aug. 4, 2010

(87) PCT Pub. No.: WO2009/100609
PCT Pub. Date: Aug. 20, 2009

(65) Prior Publication Data
US 2011/0009120 A1    Jan. 13, 2011

(30) Foreign Application Priority Data
Feb. 5, 2008   (CN) .......................... 2008 1 0008134

(51) Int. Cl.
*G06F 15/16*   (2006.01)
(52) U.S. Cl. ......................... 455/436; 455/442
(58) Field of Classification Search ............... 455/404.1, 455/436, 437, 439, 442; 370/331
See application file for complete search history.

(56) References Cited

U.S. PATENT DOCUMENTS

| 2008/0096565 A1 | 4/2008 | Jin et al. |
| 2009/0080382 A1* | 3/2009 | Chen et al. .................... 370/331 |

FOREIGN PATENT DOCUMENTS

| CN | 1985536 A | 6/2007 |
| CN | 101227677 A | 7/2008 |
| CN | 101227733 A | 7/2008 |

OTHER PUBLICATIONS

International Search Report on international application No. PCT/CN2008/002157, mailed on Mar. 26, 2009.
English Translation of the Written Opinion of the International Search Authority in international application No. PCT/CN2008/002157, mailed on Mar. 26, 2009.

* cited by examiner

*Primary Examiner* — Sam Bhattacharya
(74) *Attorney, Agent, or Firm* — Oppedahl Patent Law Firm LLC (57) ABSTRACT

A domain transferring method for the single radio voice call continuity, a UE accesses via an LTE/SAE network, and sets up an IMS session anchored at a VCC AS with a remote node; when an S-IWF receives a handover request used to transfer the session to make the session access from a CS domain, the method comprises: the LTE/SAE network sends a handover command to the UE, the UE sends a handover complete message to a target access device after receiving the handover command; after the UE sends the handover complete message, or after the S-IWF receives the handover complete message, a release session notification message is sent to a VCC AS; after receiving the session release notification message, the VCC AS releases the session resources of the session.

10 Claims, 9 Drawing Sheets

DOMAIN TRANSFERRING METHOD FOR SINGLE RADIO VOICE CALL CONTINUITY

TECHNICAL FIELD

The present invention relates to the field of communications, especially to a domain transferring method for single radio voice call continuity (SR VCC) which is accessed the architecture of the long term evolution/system architecture evolution (LTE/SAE) of the next generation mobile communication networks.

BACKGROUND

Figure 1:
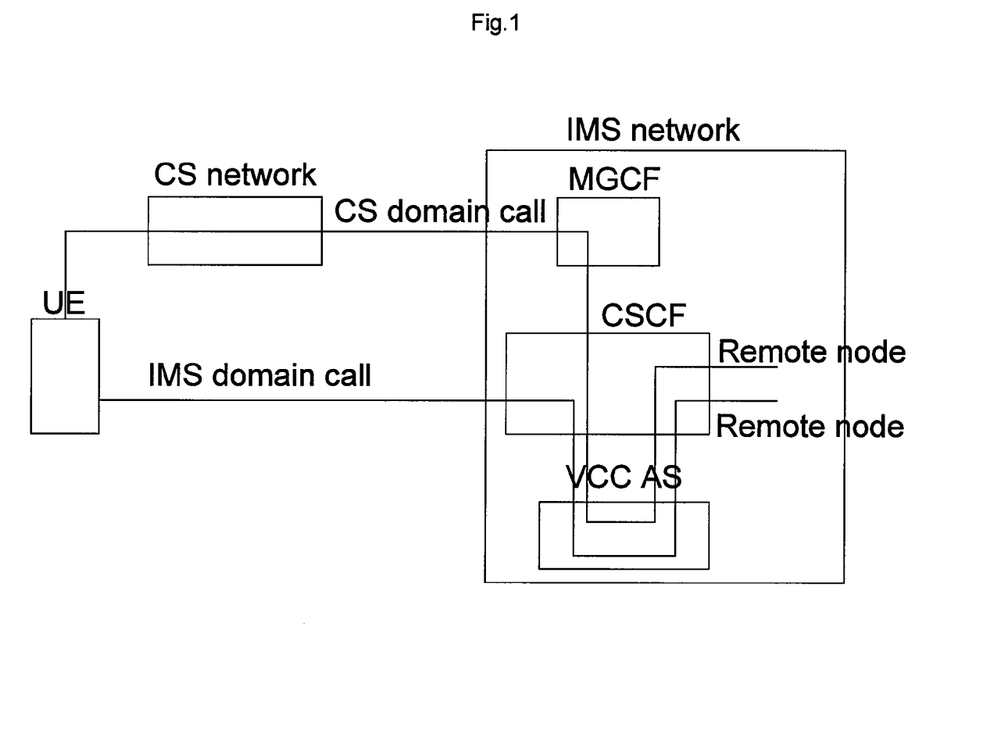
FIG. 1 is a schematic diagram illustrating a traditional VCC solution.

To ensure the continuity of a voice call between a circuit switched (CS) domain and an internet protocol (IP) multimedia core network subsystem (IMS) domain, i.e. the voice call continuity (VCC), a traditional solution is as shown in FIG. 1:

A dual mode user equipment (UE) is registered both in the CS domain and the IMS domain. When the UE initiates a voice call in the CS domain or the IMS domain, the voice call is equally anchored at a voice call continuity application server (VCC AS) in the IMS domain. The dual mode UE keeps two numbers which are known to the VCC AS: a VCC Domain Transfer URI (VDI), indicating that a user is transferred from the CS domain to the IMS domain; and a VCC Domain Transfer Number (VDN), indicating that a user session is transferred from the IMS domain to the CS domain at a service layer. When the dual mode UE has initiated a voice call in the CS domain, and prepares to be transferred from the CS domain to the IMS domain, the dual mode UE uses the VDI as the called number in the IMS domain, and initiates a session request to the VCC AS; after receiving the session request, the VCC AS releases the resources in the CS domain, and associates the resources between established session and original session in the IMS domain, thus the transferring is completed. Likewise, when the dual mode UE has initiated a voice call in the IMS domain, and prepares to be transferred from the IMS domain to the CS domain, the dual mode UE uses the VDN as the called number in the CS domain, and initiates a session request to the VCC AS; after receiving the session request, the VCC AS releases the resources in the IMS domain, and associates the resources in IMS between established session and original session in the IMS domain, thus the transferring is completed.

The above-mentioned contents describe the traditional principles for realizing VCC, in which the dual mode UE must support the Dual Radio, i.e. voice calls can be realized simultaneously both in IMS domain and CS domain.

To realize IP Multimedia Subsystem (IMS) centralized services (ICS) in the IMS domain, an application server IMS CS Control Function (ICCF) is added in the IMS domain, the ICCF is adjacent to the VCC AS, and is located at the first application server (AS) for initiating a call, while located at the last AS for terminating a call. Other CS network is as a channel to access IMS domain, and all services are steered and triggered in the ICCF of the IMS domain.

Figure 2:
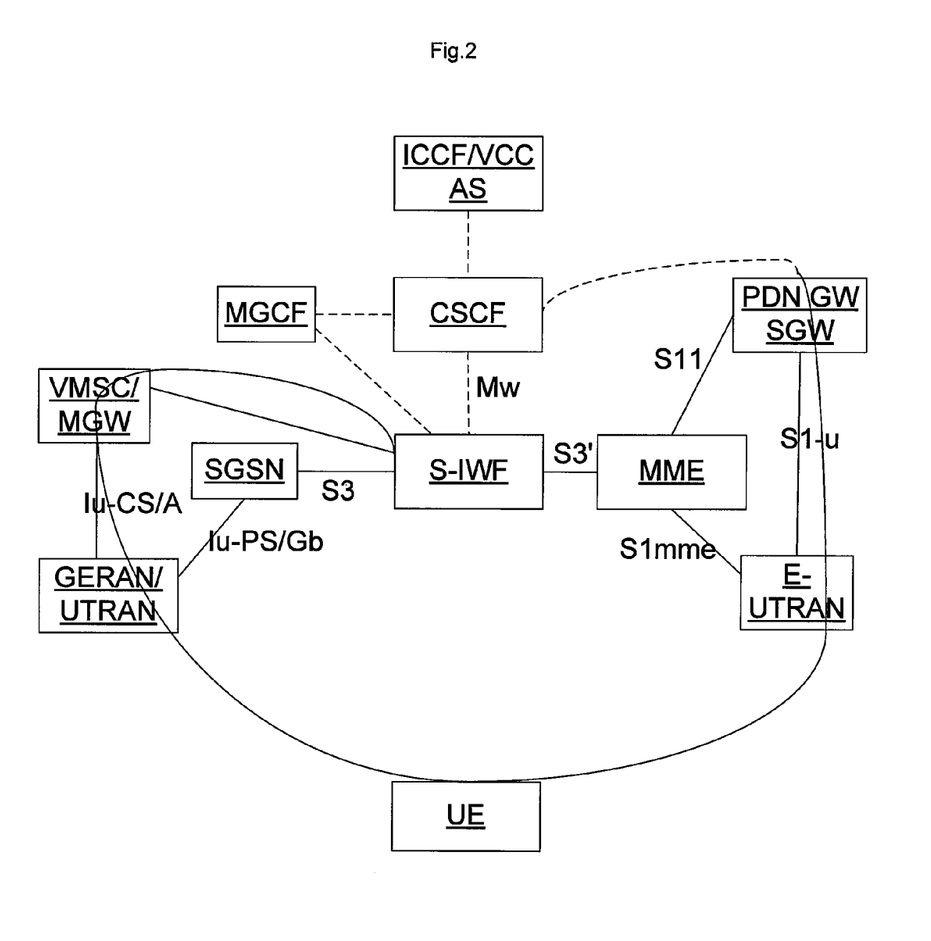
FIG. 2 is a diagram illustrating an SR VCC architecture based on an LTE/SAE network.
Figure 3:
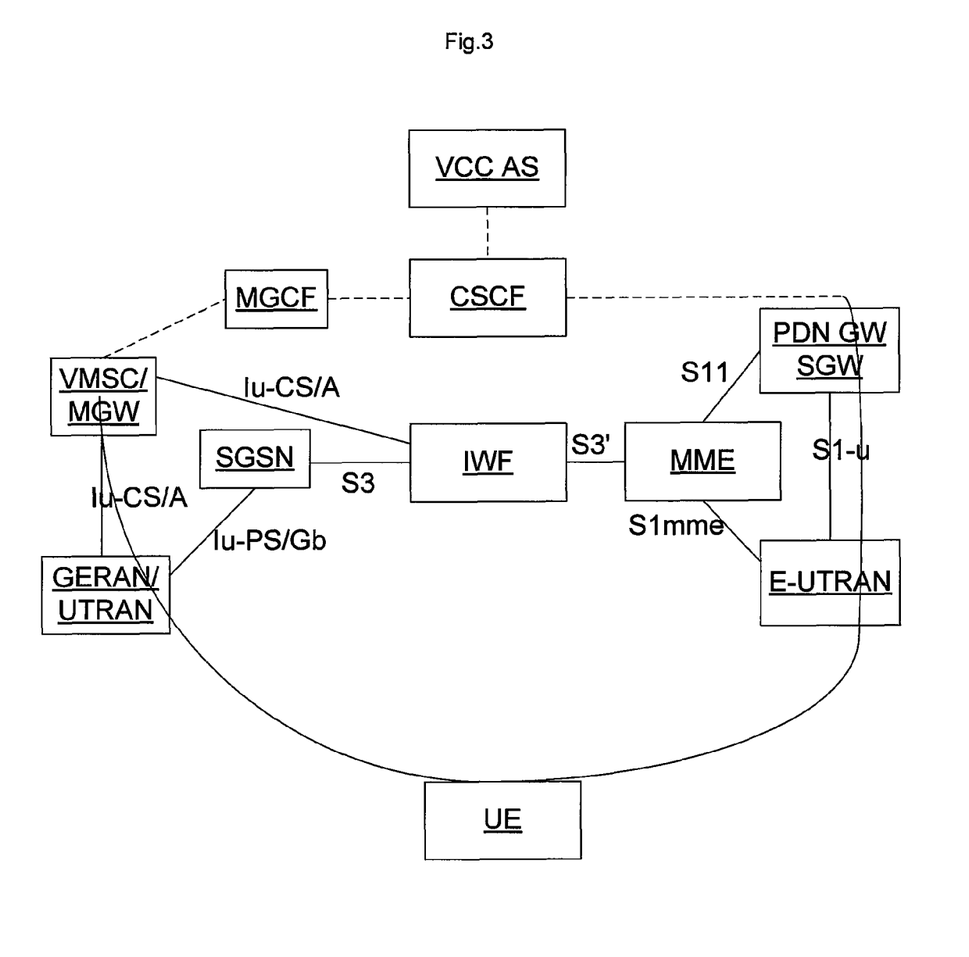
FIG. 3 is another diagram illustrating an SR VCC architecture based on an LTE/SAE network.

With the flat development of the network architecture, and appearances of multiple mobile access modes of high-speed bandwidth, the next generation architecture concept of the LTE/SAE is impelled to be proposed for the mobile communication network, so that an evolved wireless communication system can provide higher transmission rate, shorter transmission delay and lower cost, and meanwhile support the mobility among internal access systems of 3rd generation partnership project (3GPP), and the mobility between a 3GPP access system and a non-3GPP access system. In addition, the LTE/SAE is also used as an access means of the IMS domain, and supports the original VCC functions. However, due to reasons such as great energy consumption of mobile phone batteries and powerful mobility management capability of the LTE/SAE itself under dual modes, the single radio voice call community (SR VCC) is proposed, and currently the principle architectures of the two schemes for realizing SR VCC are as shown in FIG. 2 and FIG. 3, wherein:

the corresponding network elements of the LTE/SAE mainly include:

an evolved UTRAN (E-UTRAN) is a next generation wireless access network, which can provide higher uplink and downlink rates, lower transmission delay and more reliable wireless transmission.

A mobility management entity (MME) is a functional entity for a control plane, and is responsible for the management and storage of the UE contexts (e.g. a UE/user ID, a mobility management state, user security parameters, etc.); the MME assigns temporary identifications for the users, and is responsible for authenticating the users when the UE resides in the tracking area or in the network.

An SAE gateway (SAE GW) is a functional entity for a user plane, and responsible for the routing processing of the user plane data, and can be classified into a Serving SAE GW (SGW) and a Public Data Network Gateway (PDN GW). The SGW is a mobile anchor point between an SAE system and a traditional 3GPP system, and is also a mobile anchor point between the SAE system and the E-UTRAN. The PDN GW terminates the UE downlink data which is in an idle state, and initiates a paging when the downlink data sent to the UE arrives; the PDN GW manages and stores the UE context, such as IP bearer service parameters and routing information within the network etc.

The existing 2nd Generation (2G)/3rd Generation (3G) mobile network mainly consists of the following network elements:

a 2G GSM/EDGE radio access network (GERAN) or 3G universal terrestrial radio access network (UTRAN), and a core network (CN). Network elements of the core network contain a CS domain network element that is a visited mobile services switch center (VMSC)/mobile services switch center (MSC) and a packet switched (PS) domain network element that is a serving GPRS support node (SGSN), wherein the VMSC/MSC provides circuit voice services, circuit data services and short message services; the SGSN is connected with the SAE GW of the LTE/SAE, and provides services in the PS domain. A home subscriber server (HSS) manages data of the CS domain, the PS domain and the IMS domain.

An IMS network mainly includes the following network elements:

core network elements such as a call session control function (CSCF), a media gateway control function (MGCF) etc., and a VCC AS for realizing the VCC functions.

The above-mentioned contents describe the networks of the existing technologies. To realize single radio voice call continuity, a single-radio-voice-call-continuity control function is added, such as a shared inter working function (S-IWF) as shown in FIG. 2, and an inter working function (IWF) as shown in FIG. 3; the S-IWF/IWF is connected with the network element VMSC in the CS domain and network element SGSN in the PS domain of the 2G/3G core network, and the MME in an LTE/SAE network; and the S-IWF/IWF controls the switching between the LTE/SAE network and 2G/3G network. The S-IWF/IWF is connected with the ICCF/VCC AS via the CSCF in the IMS domain network, to make sure that all calls can be anchored at the ICCF/VCC AS in the IMS domain, and guarantee the realization of VCC basic functions.

Wherein, in the scheme as shown in FIG. 2, the interface between the S-IWF and the VMSC is an E-interface, and mobile application part (MAP) signals are adopted in the E-interface, an inter-office handover mode of the CS domain is adopted in the handover between the S-IWF and the VMSC; in the scheme as shown in FIG. 3, the interface between the IWF and the VMSC is an A/Iu-CS Interface, and an intra-office handover mode in the CS domain is adopted in the handover between the IWF and the VMSC.

In the above-mentioned network architectures, the UE can access the IMS domain via the LTE/SAE, and also can access the IMS network via the PS domain (i.e. the access equipment SGSN of the PS domain as shown in the figure) of the 2G/3G network (e.g. the access equipment GERAN/UTRAN of the CS domain as shown in the figure), to enjoy IMS services, and meanwhile the UE can access the 2G/3G CS network (i.e. the VMSC/MGW as shown in the figure), and provides CS services such as voice calls etc.

Figure 4:
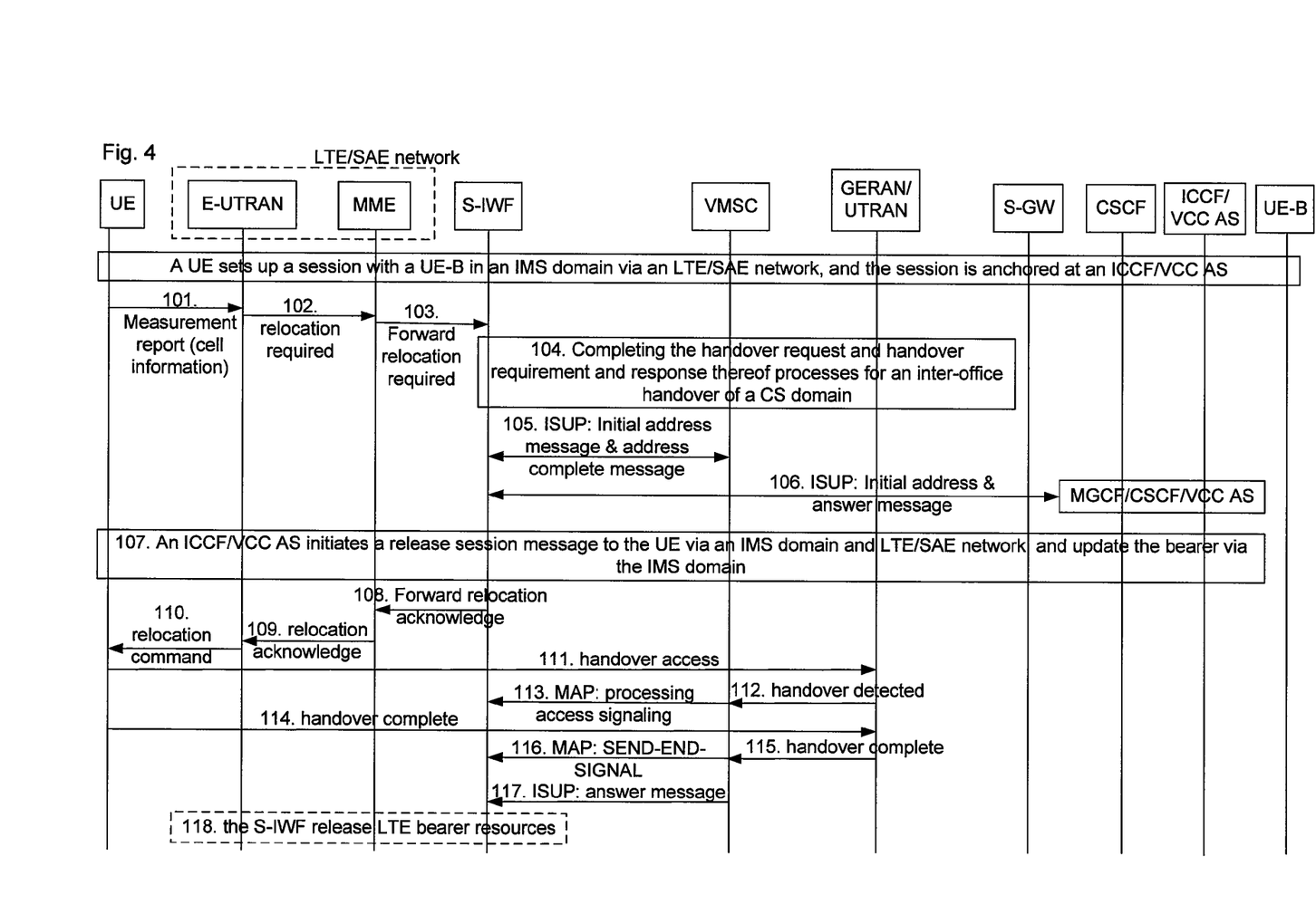
FIG. 4 is a flowchart illustrating the process for realizing a transfer from an LTE/SAE to a CS domain based on SR VCC in FIG. 2 according to existing technologies.

FIG. 4 is a flowchart illustrating the process for realizing the transferring from an LTE/SAE to a CS domain under an SR VCC architecture as shown in FIG. 2, and a session is initiated between a UE and a UE-B in an IMS, and is anchored at a VCC AS; the transferring process as shown in FIG. 4 includes the following steps:

101, a UE sends a measurement report to a radio network element E-UTRAN of an LTE/SAE;

102, the E-UTRAN initiates a relocation required message to an MME according to the information included in the measurement report;

103, the MME sends a forward relocation required message to an S-IWF according to the information included in the relocation required message, and indicates the S-IWF to handover the corresponding session to a CS domain and make the session access from the CS domain;

104, the processes of requesting a handover and requiring a handover and responses thereof for an inter-office handover of the CS domain among the S-IWF and CS domain network elements of a VMSC and a GERAN/UTRAN, are completed;

the CS domain inter-office handover includes: the S-IWF sends a MAP-PREPARE-HANDOVER request message to the VMSC, and the VMSC sends a handover request message to the GERAN/UTRAN, then the GERAN/UTRAN sends a handover request acknowledge message back to the VMSC, and the VMSC sends a MAP-PREPARE-HANDOVER acknowledge message back to the S-IWF, and the message includes a handover number (HO number);

105, the S-IWF sends an initial address message of ISDN user part (ISUP) signals to the VMSC according to the handover number, and the VMSC sends an address complete message of the ISUP back to the S-IWF;

106, the S-IWF sends the initial address message of the ISUP to an ICCF/VCC AS via the VMSC which is in the CS domain and an MGCF and a CSCF which are in an IMS domain. The message includes a VDN, which indicates that the session is transferred from the IMS domain to the CS domain in a service layer, and the ICCF/VCC AS sends an answer message back to the S-IWF;

107, the ICCF/VCC AS sends a session release message to the UE via the IMS domain and an LTE/SAE network, and notifies the UE-B to update the bearer via the IMS domain;

108, the S-IWF sends a forward relocation request acknowledge message back to the MME;

109, the MME sends a relocation request acknowledge message back to the E-UTRAN;

110, the E-UTRAN sends a relocation command message (handover command) back to the UE;

111, the UE sends a handover access message to a target GERAN/UTRAN;

112, after detecting the handover, the GERAN/UTRAN sends a handover detected message to the VMSC;

113, the VMSC sends a MAP-PROCESS-ACCESS-SIGNALLING request message to the S-IWF, the message is used to notify the S-IWF that the UE has started to access from the CS domain;

114, the UE sends a handover completed message to the GERAN/UTRAN;

115, the GERAN/UTRAN sends a handover completed message to the S-IWF via the VMSC;

116, the VMSC sends a MAP-SEND-END-SIGNAL request message to the S-IWF, to notify the S-IWF that the UE has been transferred to the CS domain, and the S-IWF determines the completion of the transfer from the MAP-SEND-END-SIGNAL request message;

117, the VMSC sends an answer message of the ISUP (corresponding to the initial address message of the ISUP in step 105) back to the S-IWF;

118, after the handover is completed, the S-IWF notifies the LTE/SAE network to release resources.

If the VCC AS has released LTE/SAE resources in step 107, step 118 is no more executed.

Figure 5:
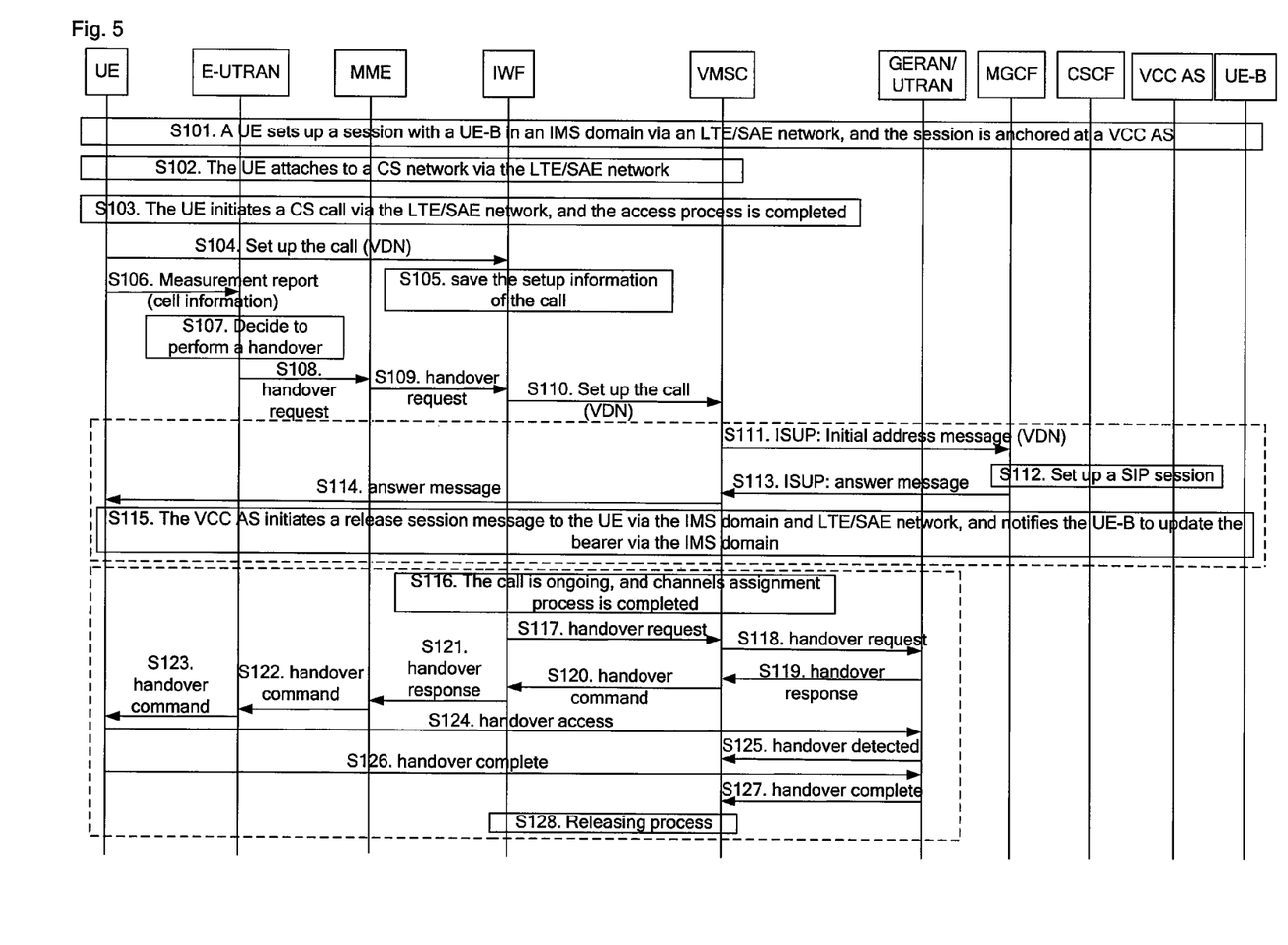
FIG. 5 is a flowchart illustrating the process for realizing a transfer from an LTE/SAE to a CS domain based on SR VCC in FIG. 3 according to existing technologies.

FIG. 5 is a flowchart illustrating the process for realizing a call transfer from an LTE/SAE to a CS domain under SR VCC architecture as shown in FIG. 3, mainly including the following steps:

S101, a session is initiated between a UE and a UE-B in an IMS, and is anchored at a VCC AS;

S102, the UE attaches to a CS network via the LTE/SAE network;

S103, the UE initiates a CS call via the LTE/SAE network, and the access process (including encryption and authorization) is completed;

S104, the UE sends a call setup message (e.g. SETUP message) to a network side (e.g. IWF), the message includes a VDN as a called number;

S105, the IWF saves the call setup information;

S106, the UE sends a measurement report to an LTE/SAE radio network element E-UTRAN;

S107, the E-UTRAN decides to perform a handover;

S108, the E-UTRAN sends a handover request message to an MME according to the information included in the measurement report;

S109, the MME sends a handover request message to the IWF;

S110, the IWF sends a call setup message (e.g. a SETUP message) to a VSMC according to the information saved in step S105, and the message includes a VDN as a called number;

after step S110, steps S111~S115 and steps S116~S128 will be respectively executed simultaneously:

S111, according to the VDN in the call setup message, a VMSC sends an initial address message of the ISUP to set up a call to an MGCF;

S112, after receiving the ISUP initial address message, the MGCF sets up a SIP (session initial protocol) session to the VCC AS;

S113, the MGCF sends an ISUP answer message to the VMSC after the SIP session is set up successfully;

S114, the VMSC sends an answer message (or CONNECT message) to the UE;

S115, the VCC AS initiates a release session message to the UE via the IMS domain and the LTE/SAE network, and notifies the UE-B to update the bearer via the IMS domain;

S116, the VMSC sends a channel assignment request message to the IWF, and the IWF sends a channel assignment response message back to the VMSC, thus the channel assignment process is completed;

S117, then the IWF sends a handover request message to the VMSC according to the information received in step S109;

S118, the VMSC sends a handover request message to a target GERAN/UTRAN;

S119, the target GERAN/UTRAN completes the resources reservation, and sends a handover response message to the VMSC;

S120, the VMSC sends a handover command message to the IWF;

S121, the IWF sends a handover response message to the MME;

S122, the MME sends a handover command message to the E-UTRAN;

S123, the E-UTRAN sends a handover command message to the UE;

S124, the UE sends a handover access message to the target GERAN/UTRAN, to access the target GERAN/UTRAN;

S125, after detecting the handover, the GERAN/UTRAN sends a handover detected message to the VMSC;

S126~S127, the handover of the UE is completed; the VMSC receives a handover complete message;

S128, the VMSC releases resources of the handover initiating side LTE/SAE.

Figure 6:
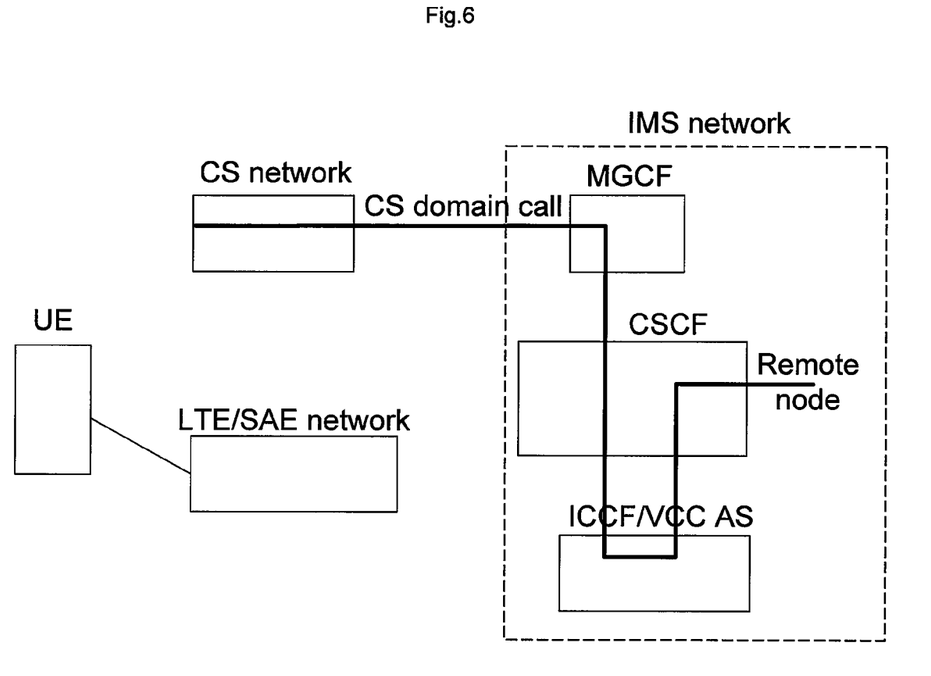
FIG. 6 is a schematic diagram illustrating the failed transfer from an LTE/SAE to a CS domain under an existing SR VCC architecture.

The following problems exist in the above-mentioned technologies: after receiving the initial address message of the ISUP (step 106 and step S111), the ICCF/VCC AS will release the session set up between the ICCF/VCC AS and the UE via the LTE/SAE, while here the UE may have not received the handover command, or may be in the process of handover, and the session path is as shown in FIG. 6, only the link from the CS network to the remote node is connected between the UE and the remote node. The session between the UE and the remote node can be set up only after the UE is transferred to the CS domain successfully; if the UE is not transferred to the CS domain successfully, then the UE is unable to return to the original session path to continue the session as the session resources between the VCC AS and the LTE/SAE network have been released.

SUMMARY

The technical problem to be solved in the present invention is to provide a domain transferring method for single radio voice call continuity, so that a UE can return to the original session path in an LTE/SAE network to continue the session when the UE is unable to be transferred from the LTE/SAE network to a CS domain successfully.

To solve the above-mentioned problem, the present invention provides a domain transferring method of single radio voice call continuity, a UE accesses via a long term evolution (LTE)/system architecture evolution (SAE) network, and sets up an IP multimedia subsystem (IMS) session with a remote node, and the session is anchored at a voice call continuity application server (VCC AS); after an shared inter working function (S-IWF) receives a handover request which is sent by the LTE/SAE network and used to transfer the session to make the session access from a circuit switched (CS) domain, the method includes:

the LTE/SAE network sends a handover command to the UE, and after receiving the handover command, the UE sends a handover completed message to a target access equipment in the CS domain;

after the UE sends the handover completed message, or after an S-IWF receives a message sent by the UE which indicates that the handover is completed, a release session notification message is sent to the VCC AS;

after receiving the release session notification message, the VCC AS releases session resources of the session from the VCC AS to the LTE/SAE network.

Further, after the S-IWF receives the handover request sent by the LTE/SAE network, and before the LTE/SAE network sends the handover command to the UE, the method may also include:

the S-IWF may send the VCC AS a VCC transfer request including a VCC Domain Transfer Number (VDN); the VDN may be used to indicate the VCC AS to perform a single radio voice call continuity (SR VCC) domain transfer;

the VCC AS may learn from the VDN that it needs to release session resources of the session from the VCC AS to the LTE/SAE network only after receiving the release session notification message.

Further, after the S-IWF receives the handover request sent by the LTE/SAE network, and before the LTE/SAE network sends the handover command to the UE, the method may also include:

before sending a VCC transfer request to the VCC AS to indicate the VCC AS to perform a VCC domain transfer, the S-IWF may send a transfer notification message to the VCC AS, to notify the VCC AS that an SR VCC domain transfer is about to be performed;

the VCC AS may learn from the transfer notification message that it needs to release session resources of the session from the VCC AS to the LTE/SAE network only after receiving the release session notification message.

Further, the transfer notification message may be an unstructured supplementary service data (USSD) message or a "MESSAGE" message of a session initial protocol (SIP).

Further, the release session notification message may be a USSD message, or a SIP indication message including a SIP-MESSAGE message, or a SIP INVITE message, or a SIP re-INVITE message.

Further, after receiving the release session notification message, the VCC AS may also release the session resources of the session of the LTE/SAE network and update the remote bearer of the session.

The present invention also provides a domain transferring method for single radio voice call continuity, and a UE accesses via an LTE/SAE network, and sets up an IMS session with a remote node and the session is anchored at a VCC AS; after an inter working function (IWF) receives a call setup message including a VDN which is sent by the UE, and a handover request which is sent by the LTE/SAE network and used to transfer the session to make the session access from a CS domain, the IWF controls the LTE/SAE network and CS domain network to perform the subsequent handover operations, the method includes:

after receiving a handover completed message sent by the LTE/SAE network, the UE sends a handover access message and a handover completed message to a target access equipment in the CS domain, and sends the VCC AS a notification message which indicates that the handover is completed;

after receiving the notification message which indicates that the handover is completed, the VCC AS releases session resources of the session from the VCC AS to the LTE/SAE network.

Further, the VDN may be used to indicate the VCC AS to perform a domain transferring of single radio voice call continuity;

after the IWF receives the handover request sent by the LTE/SAE network and before the session resources of the session from the VCC AS to the LTE/SAE network are released, the method may also include:

the IWF may send a call setup message including the VDN to a VMSC; after receiving the call setup message, the VMSC may send an ISUP initial address message including the VDN to a media gateway control function (MGCF);

after receiving the ISUP initial address message, the MGCF may set up a SIP session with the VCC AS using the VDN;

the VCC AS may learn from the VDN that it needs to releases session resources of the session from the VCC AS to the LTE/SAE network only after receiving the notification message which indicates that the handover is completed.

Further, after receiving the notification message which indicates that the handover is completed, the VCC AS may also updates the remote bearer of the session.

Further, the notification message which indicates that the handover is completed may be a USSD message or a SIP message.

The present invention provides a method for realizing single radio voice call continuity under architectures of the LTE/SAE and 2G/3G networks, and solves the problem in existing technologies that a UE can not return to an original session path to continue the session if the transferring from the LTE/SAE to the CS domain fails.

DETAILED DESCRIPTION OF THE INVENTION

The present invention is described in detail in combination with the attached figures and embodiments.

Figure 7:
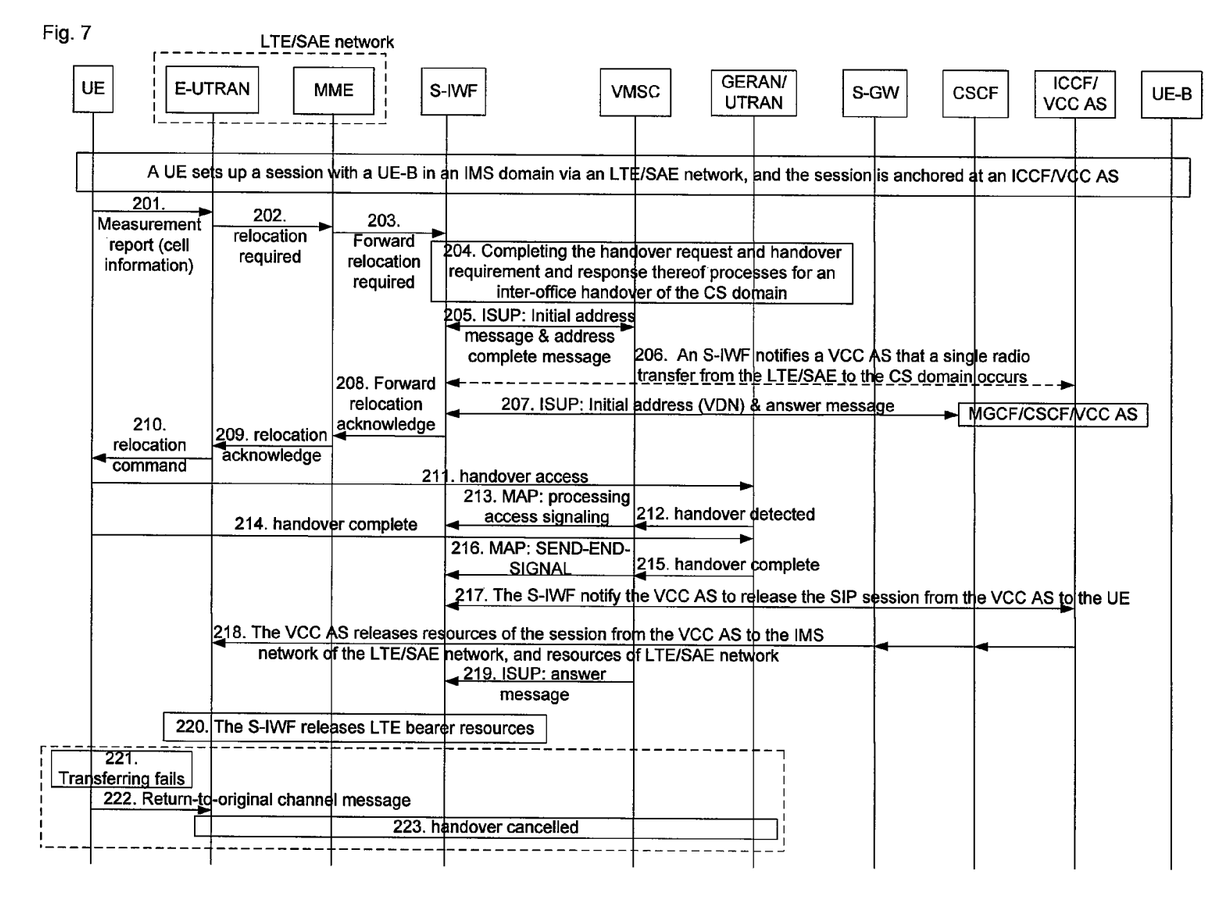
FIG. 7 is a flowchart illustrating the process for realizing a transfer from an LTE/SAE to a CS domain based on the SR VCC in FIG. 2 according to an embodiment of the present invention.

FIG. 7 illustrates an embodiment of the present invention for realizing a transfer from an LTE/SAE to a CS domain based on the SR VCC architecture in FIG. 2, a UE initiates a session in an IMS domain via an LTE/SAE network, and the session is anchored at a VCC AS in the IMS domain. The transferring method according to the embodiment includes the following steps:

201, the UE sends a measurement report to the radio network element E-UTRAN of the LTE/SAE;

202, the E-UTRAN initiates a relocation required message to an MME according to the information included in the measurement report;

203, according to the information included in the relocation required message, the MME sends a forward relocation required message to an S-IWF, to indicate the S-IWF to transfer the corresponding session to make the session access from a CS domain;

204, the processes of requesting a handover and requiring a handover and responses thereof for an inter-office handover of the CS domain among the S-IWF and CS domain network elements of a VMSC and a GERAN/UTRAN, are completed;

the Inter-office handover includes: the S-IWF sends a MAP-PREPARE-HANDOVER request message to the VMSC, and the VMSC sends a handover request message to the GERAN/UTRAN, then the GERAN/UTRAN sends a handover request acknowledge message back to the VMSC, and the VMSC sends a MAP-PREPARE-HANDOVER acknowledge message back to the S-IWF, and the message includes a handover number (HO number);

205, the S-IWF sends an initial address message of ISUP to the VMSC according to the handover number, and the VMSC sends an address complete message of ISUP back to the S-IWF;

206 (Optional), the S-IWF sends a transfer notification message to an ICCF/VCC AS to notify the VCC AS that a single radio transfer from the LTE/SAE to the CS domain occurs (i.e. an SR VCC domain transfer is about to be performed);

under such a condition that the ICCF and VCC AS are in the same network element and the UE has been registered in a target VMSC, the notification message can be a USSD (Unstructured Supplementary Service Data) message, which is used to notify the ICCF/VCC AS via the VMSC and an HSS;

the notification message can also be a SIP-MESSAGE message, the S-IWF notifies the VCC AS via a CSCF;

207, the S-IWF sends an initial address message of ISUP to the ICCF/VCC AS via the VMSC which is in the CS domain and an MGCF and the CSCF which are in the IMS domain. The message includes a VDN (indicating that a session is transferred from the IMS domain to the CS domain in a service layer); the ICCF/VCC AS sends an answer message back to the S-IWF, which indicates that the transferring from the IMS domain to the CS domain has been completed;

the S-IWF initiates a VCC transfer request to the VCC AS via the initial address message of the ISUP mentioned in this step, a transferring from the IMS domain to the CS domain is requested;

meanwhile, if the ICCF/VCC AS receives the notification message mentioned in step 206, then the session resources from the ICCF/VCC AS to the UE are not released after the transferring from the IMS domain to the CS domain is completed according to the notification message;

or in step 207, a special VDN can be included to indicate a domain transfer of SR VCC, and the ICCF/VCC AS identifies the transfer from the LTE/SAE network of SR VCC to the CS network according to the special VDN number in the initial address message of the ISUP, instead of only identifying the transfer from the IMS domain to the CS domain, so that session resources from the ICCF/VCC AS to the UE are not released after the transferring from the IMS domain to the CS domain is completed;

208, the S-IWF sends a forward relocation required acknowledge message back to the MME;

209, the MME sends a relocation required acknowledge message back to the E-UTRAN;

210, the E-UTRAN sends a relocation command message back to the UE;

211, the UE sends a handover access message to a target GERAN/UTRAN;

212, after detecting the handover, the GERAN/UTRAN sends a handover detected message to the VMSC;

213, the VMSC sends a MAP-PROCESSING-ACCESS-SIGNALING message to the S-IWF, the message is used to notify the S-IWF that a UE has started to access from the CS domain;

214, the UE sends a handover completed message to the GERAN/UTRAN;

215, the GERAN/UTRAN sends a handover completed message to the S-IWF via the VMSC;

216, the VMSC sends the S-IWF a MAP-SEND-END-SIGNAL message (i.e. a MAP sending-end-signal message) to notify the S-IWF that the UE has been completed the handover to the CS domain;

217, the VMSC sends a release session notification message to the ICCF/VCC AS via the CSCF, to notify the ICCF/VCC AS to release session resources from the ICCF/VCC AS to the LTE/SAE;

under such a condition that the ICCF and VCC AS are in the same network element and the UE has been registered in the target VMSC, the release session notification message can be a USSD message, which is used to notify the ICCF/VCC AS via the VMSC and a home subscriber server;

the release session notification message can also be a SIP message which is used to notify the VCC AS, the S-IWF initiates a subscription message to the VCC AS, to subscribe to the session identification from the VCC AS to the UE, and then indicates the VCC AS to release session resources from the VCC AS to the UE through a SIP indication message;

the release session notification message can also be a SIP message which is used to notify the VCC AS, e.g. a SIP-MESSAGE message or a SIP INVITE message or a SIP re-INVITE message which are initiated by the S-IWF, and indicate the VCC AS to release session resources from the VCC AS to the UE;

218, after receiving the release session notification message mentioned in step 217, the ICCF/VCC AS releases IMS domain session resources of the session from the ICCF/VCC AS to the LTE/SAE network, and can also simultaneously release relevant session resources in the LTE/SAE network, and meanwhile the ICCF/VCC AS sends an update bearer message to the remote end of the session;

219, the VMSC sends an ISUP Answer message (corresponding to the initial address message in step 205 of ISUP) back to the S-IWF;

220, after the transferring is completed, the S-IWF notifies the LTE/SAE network to release correspondent resources of the session;

221~223, if the UE finds that the transferring is not successful (e.g. in step 211, the UE fails to access the radio GERAN/UTRAN, then the UE will determine that the transferring fails), then the UE sends a return-to-original channel message to the E-UTRAN, and the E-UTRAN sends a handover cancellation message to the MME, S-IWF and the network elements of the CS domain according to the received return-to-original channel message, so that the UE can return to the original session path to continue the session.

Figure 8:
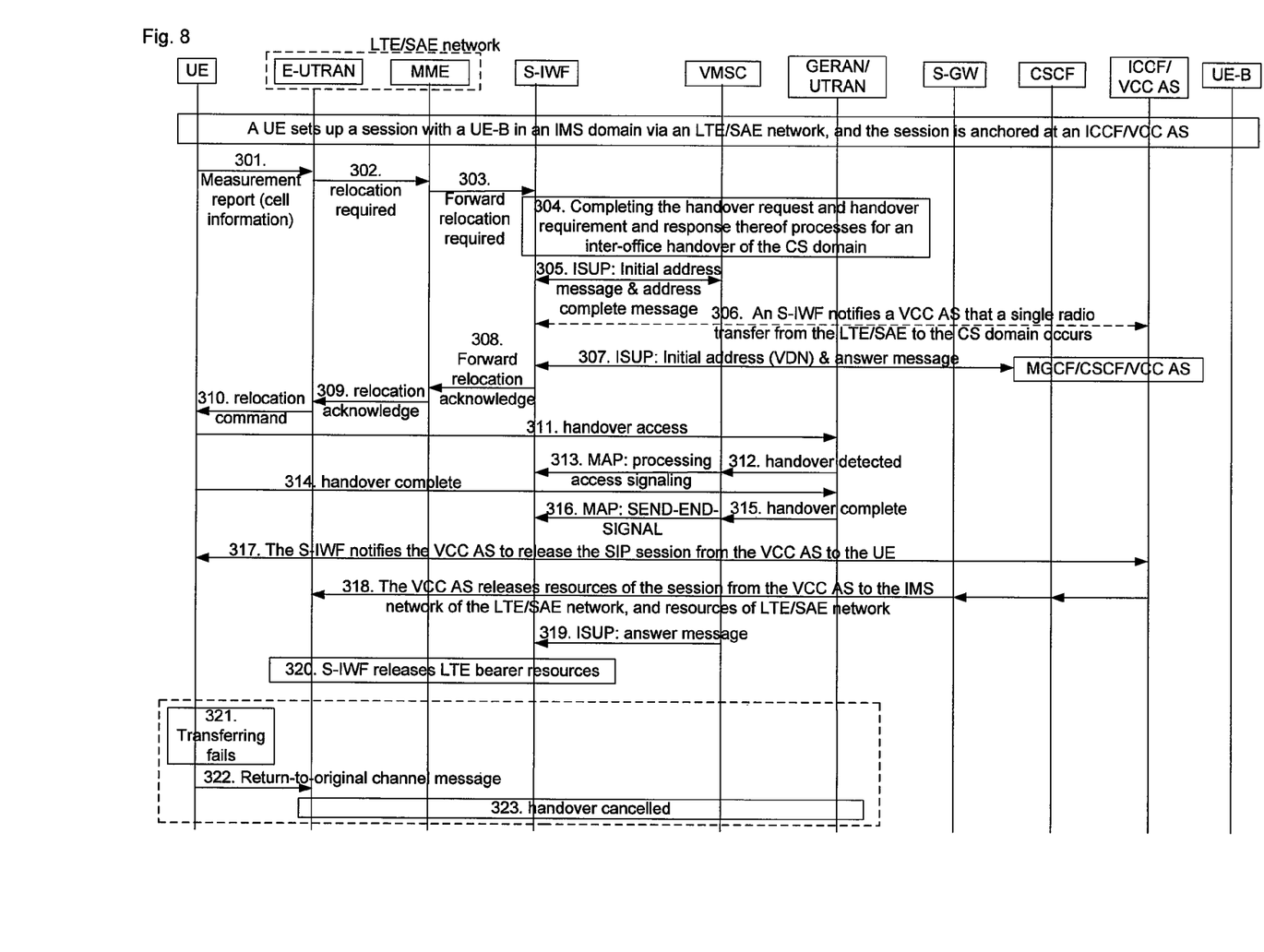
FIG. 8 is a flowchart illustrating the process for realizing a transfer from an LTE/SAE to a CS domain based on the SR VCC in FIG. 2 according to another embodiment of the present invention.

FIG. 8 shows another embodiment of the present invention for realizing the transferring from an LTE/SAE to a CS domain based on the SR VCC architecture in FIG. 2, a UE initiates a session in an IMS domain via an LTE/SAE network, and the session is anchored at a VCC AS in the IMS domain. The transferring method according to the embodiment includes the following steps:

301, the UE sends a measurement report to an LTE/SAE radio network element E-UTRAN;

302, the E-UTRAN initiates a relocation required message to an MME according to the information included in the measurement report;

303, according to the information included in the relocation required message, the MME sends a forward relocation required message to an S-IWF, to indicate the S-IWF to transfer the corresponding session to make the session access from a CS domain;

304, the processes of requesting a handover and requiring a handover and responses thereof for an inter-office handover of the CS domain among the S-IWF and CS domain network elements of a VMSC and a GERAN/UTRAN, are completed;

the Inter-office handover includes: the S-IWF sends a MAP-PREPARE-HANDOVER request message to the VMSC, and the VMSC sends a handover request message to the GERAN/UTRAN, then the GERAN/UTRAN sends a handover request acknowledge message back to the VMSC, and the VMSC sends a MAP-PREPARE-HANDOVER acknowledge message back to the S-IWF, and the message includes a handover number (HO number);

305, the S-IWF sends an initial address message of ISUP to the VMSC according to the handover number, and the VMSC sends an address complete message of ISUP back to the S-IWF;

306~316, please refer to the descriptions of steps 206~216 in the above-mentioned embodiment, which are not repeated here;

317, the UE sends a release session notification message to an ICCF/VCC AS, to notify the ICCF/VCC AS to release session resources from the ICCF/VCC AS to the UE, and the message indicates that the transferring from the LTE/SAE to the CS domain is completed;

under such a condition that the ICCF and VCC AS are in the same network element and the UE has been registered in a target VMSC, the notification message can be a USSD message, which is used to notify the ICCF/VCC AS via the VMSC and a home subscriber server;

318, after receiving the release session notification message mentioned in step 317, the ICCF/VCC AS releases the IMS domain session resources of the session from the ICCF/VCC AS to the LTE/SAE network and session resources of the LTE/SAE, and meanwhile the ICCF/VCC AS can also send an update bearer message to the remote end of the session;

319, the VMSC sends an ISUP Answer message back to the S-IWF (corresponding to the ISUP initial address message in step 305);

the above-mentioned two steps 318 and 319 need not to be performed in sequence;

320, after the transferring is completed, the S-IWF notifies the LTE/SAE network to release the corresponding resources of the session;

321~323, if the UE finds that the transfer is not successful (e.g. in step 311, the UE fails to access the radio GERAN/UTRAN, then the UE will determine that the transferring fails), then the UE sends a return-to-original channel message back to the E-UTRAN, and the E-UTRAN sends a handover cancellation message to the MME, S-IWF and the network elements of the CS domain according to the received return-to-original channel message, so that the UE can return to the original session path to continue the session via original session resources set up by the LTE/SAE.

Figure 9:
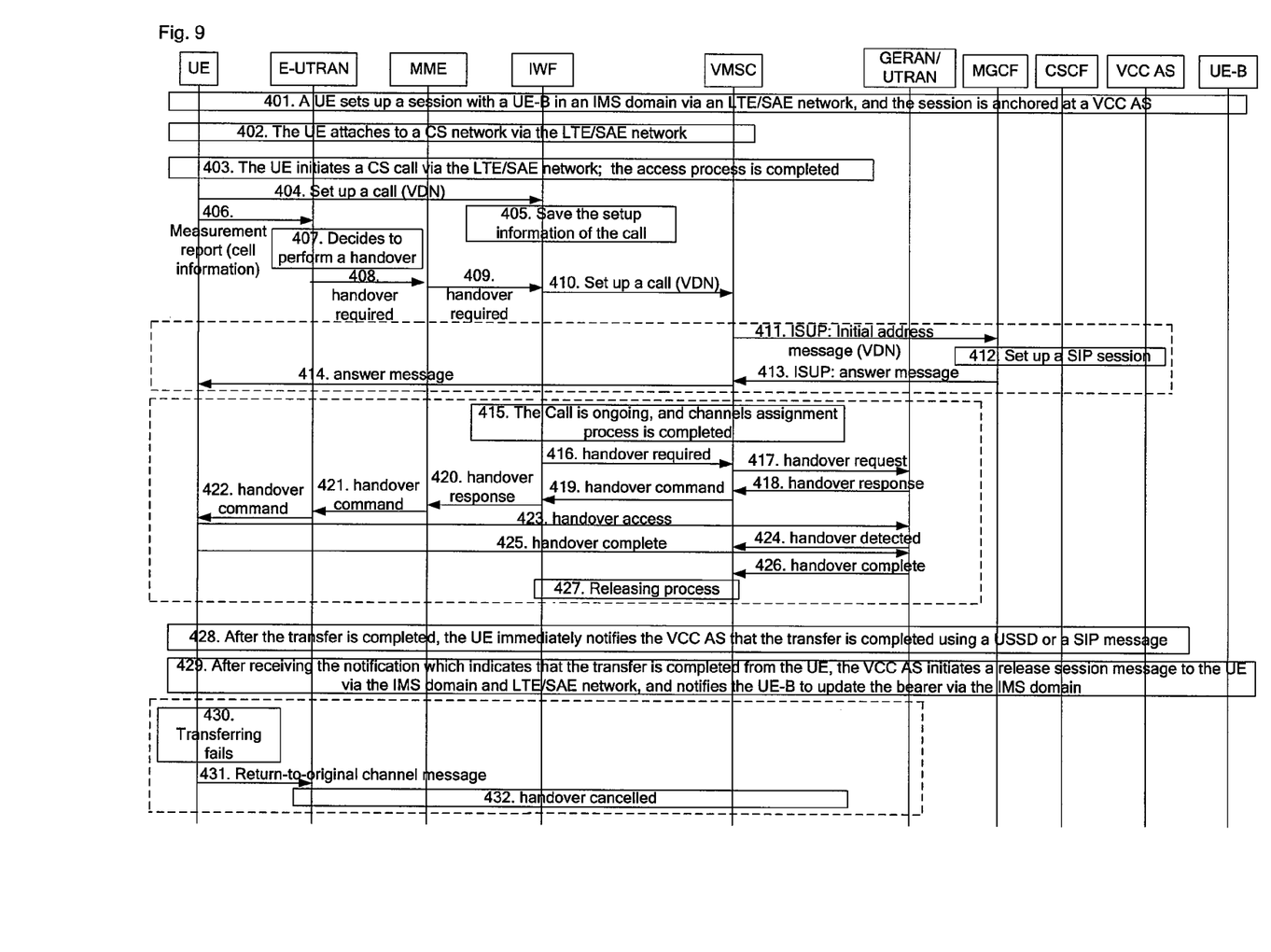
FIG. 9 is a flowchart illustrating the process for realizing a transfer from an LTE/SAE to a CS domain based on the SR VCC in FIG. 3 according to an embodiment of the present invention.

FIG. 9 shows an embodiment for realizing a transfer from an LTE/SAE to a CS domain based on the SR VCC architecture in FIG. 3, wherein an intra-office handover mode is used between an IWF and a VMSC. As shown in FIG. 9, the transferring process according to the embodiment consists of the following steps:

401, a session is initiated between a UE and a UE-B in an IMS, and is anchored at a VCC AS;

402, the UE attaches to a CS network via an LTE/SAE network;

403, the UE initiates a CS call via the LTE/SAE network, and the access process (including encryption and authorization) is completed;

404, the UE sends a call setup message (e.g. a SETUP message) to a network side, the message includes a special VDN as a called number;

a single radio UE includes a special VDN to make it differ from the ordinary dual radio UE;

405, an IWF saves the call setup information;

406, the UE sends a measurement report to an LTE/SAE radio network element E-UTRAN;

407, the E-UTRAN decides to perform a handover;

408, the E-UTRAN sends a handover required message to an MME according to the information included in the measurement report;

409, the MME sends a handover required message to the IWF;

410, the IWF sends a call setup message (e.g. a SETUP message) to a VSMC according to the information saved in step 405, and the message includes a special VDN as a called number;

411, a VMSC sends an ISUP initial address message according to the special VDN, to set up a call to an MGCF;

412, after receiving the ISUP initial address message mentioned in step 411, the MGCF sets up a SIP session to the VCC AS using the special VDN;

after step 410, step 412 will be performed simultaneously; and according to the special VDN, the VCC AS will wait for the indication which indicates that the transferring of the UE is completed after the session is set up successfully, instead of performing the operation of initiating a release session message to the UE via the LTE/SAE network immediately.

in addition, even if the above-mentioned ISUP initial address message includes an ordinary VDN, the VCC AS can also temporarily not perform the operation of initiating a release session message to the UE via the LTE/SAE network;

413, the MGCF sends an ISUP Answer message to the VMSC after the SIP session is set up successfully;

414, the VMSC sends an Answer message (e.g. a CONNECT message) to the UE;

415, the VMSC sends a channel assignment request message to the IWF, the IWF sends a channel assignment response message back to the VMSC, thus the channel assignment process is completed;

416, Then the IWF sends a handover required message to the VMSC according to the handover request message received in step 409;

417, the VMSC sends a handover request message to a target GERAN/UTRAN;

418, the target GERAN/UTRAN completes the reservation of resources, and sends a handover response message to the VMSC;

419, the VMSC sends a handover command message to the IWF;

420, the IWF sends a handover response message to the MME;

421, the MME sends a handover command message to the E-UTRAN;

422, the E-UTRAN sends a handover command message to the UE;

423, the UE sends a handover access message to the target GERAN/UTRAN, and access the target GERAN/UTRAN;

424, after detecting the handover, the GERAN/UTRAN sends a handover detected message to the VMSC;

425~426, the handover of the UE is completed; the VMSC receives a handover completed message;

427, the VMSC releases resources of the handover initiated side;

428, after step 425, the UE immediately notifies the VCC AS that the transferring has been completed via a USSD message, and the USSD message is forwarded via network element entities such as a VMSC according to the standard USSD process;

429, after receiving the indication which indicates that the transferring is completed, the VCC AS initiates a release session messages to the UE via the IMS domain and the LTE/SAE network, to release the IMS network resources from the VCC AS to the LTE/SAE network; and notifies the UE-B to update the bearer via the IMS domain;

430~432, if the UE finds that the transferring fails (e.g. in step 423, the UE fails to access to the radio GERAN/UTRAN, then the UE will determine that the transferring has failed), then the UE sends a return-to-original channel message to the E-UTRAN, and then the E-UTRAN sends handover cancellation messages to the MME, S-IWF and CS domain elements according to the received return-to-original channel message, so that the UE can return to the original session path to continue the session according to the original session resources.

During the practical application, in step 428, if a Gm interface is available, then the UE can also notify the VCC AS that the transferring has been completed via a SIP message.

INDUSTRIAL APPLICABILITY

Through the above-mentioned processes, the feasibility of the whole transferring process is guaranteed; meanwhile, the UE can also return to the original session path according to the original session resources which are not released, if the transferring fails.

For example, if step 211 or step 423 fails to be performed, the UE sends a return-to-original channel message to the E-UTRAN after finding that the transferring is not successful, the E-UTRAN sends handover cancellation messages to the MME, S-IWF/IWF and CS domain network elements according to the received return-to-original channel message, so that the UE can return to the original session path to continue the session.

What is claimed is:

1. A domain transferring method for single radio voice call continuity, a UE accessing via a long term evolution (LTE)/system architecture evolution (SAE) network, and setting up an IP multimedia subsystem (IMS) session with a remote node, and the session being anchored at a voice call continuity application server (VCC AS); after an shared inter working function (S-IWF) receives a handover request which is sent by the LTE/SAE network and used to transfer the session to make the session access from a circuit switched (CS) domain, the method including:

the LTE/SAE network sending a handover command to the UE; after receiving the handover command, the UE sending a handover completed message to a target access equipment in the CS domain;

after the UE sends the handover completed message, or after an S-IWF receives a message sent by the UE which indicates that the handover is completed, a release session notification message being sent to the VCC AS; and after receiving the release session notification message, the VCC AS releasing session resources of the session from the VCC AS to the LTE/SAE network.

2. The method according to claim 1, wherein after the S-IWF receives the handover request sent by the LTE/SAE network, and before the LTE/SAE network sends the handover command to the UE, the method also including:

the S-IWF sending the VCC AS a VCC transfer request including a VCC Domain Transfer Number (VDN); the VDN being used to indicate the VCC AS to perform a single radio voice call continuity (SR VCC) domain transfer; and the VCC AS learning from the VDN that it needs to release session resources of the session from the VCC AS to the LTE/SAE network only after receiving the release session notification message.

3. The method according to claim 1, wherein after the S-IWF receives the transfer request sent by the LTE/SAE network, and before the LTE/SAE network sends the transfer command to the UE, the method also including:

before sending a VCC transfer request to the VCC AS to indicate the VCC AS to perform a VCC domain transfer, the S-IWF sending a transfer notification message to the VCC AS, to notify the VCC AS that an SR VCC domain transfer is about to be performed; and the VCC AS learning from the transfer notification message that it needs to release session resources of the session from the VCC AS to the LTE/SAE network only after receiving the release session notification message.

4. The method according to claim 3, wherein the transfer notification message is an unstructured supplementary service data (USSD) message, or a "MESSAGE" message of session initial protocol (SIP).

5. The method according to claim 1, wherein the release session notification message is a USSD message, or a SIP indication message including a SIP-MESSAGE message, or a SIP INVITE message, or a SIP re-INVITE message.

6. The method according to claim 1, wherein after receiving the release session notification message, the VCC AS also releases the session resources of the session of the LTE/SAE network and updates the remote bearer of the session.

7. A domain transferring method for single radio voice call continuity, a UE accessing via an LTE/SAE network, and setting up an IMS session with a remote node and the session being anchored at a VCC AS; after an inter working function (IWF) receives a call setup message including a VDN which is sent by the UE, and a handover request which is sent by the LTE/SAE network and used to transfer the session to make the session access from a CS domain, the IWF controlling the LTE/SAE network and CS domain network to perform the subsequent handover operations, the method including:

after receiving a handover completed message sent by the LTE/SAE network, the UE sending a handover access message and a handover completed message to a target access equipment in the CS domain, and sending the VCC AS a notification message which indicates that a handover is completed; and after receiving the notification message which indicates that the handover is completed, the VCC AS releasing the session resources of the session from the VCC AS to the LTE/SAE network.

8. The method according to claim 7, wherein the VDN is used to indicate the VCC AS to perform a domain transferring of single radio voice call continuity;

after the IWF receives the handover request sent by the LTE/SAE network, and before the session resources of the session from the VCC AS to the LTE/SAE network are released, the method also including:

the IWF sending a call setup message including the VDN to a VMSC; after receiving the call setup message, the VMSC sending an ISUP initial address message including the VDN to a media gateway control function (MGCF);

after receiving the ISUP initial address message, the MGCF setting up a SIP session with the VCC AS using the VDN; and the VCC AS learning from the VDN that it needs to releases the session resources of the session from the VCC AS to the LTE/SAE network only after receiving the notification message which indicates that the handover is completed.

9. The method according to claim 7, wherein after receiving the notification message which indicates that the handover is completed, the VCC AS also updates the remote bearer of the session.

10. The method according to claim 1, wherein the notification message which indicates that the handover is completed is a USSD message or a SIP message.

\* \* \* \* \*